United States Patent
Krach et al.

(10) Patent No.: US 11,725,612 B1
(45) Date of Patent: Aug. 15, 2023

(54) METHOD AND SYSTEM FOR RATIONALIZING A TEMPERATURE WITHIN AN ENGINE SYSTEM

(71) Applicant: Ford Global Technologies, LLC, Dearborn, MI (US)

(72) Inventors: Adam Krach, Canton, MI (US); Sumanth Reddy Dadam, New Hudson, MI (US); Patrick Edward Smithberger, Marine City, MI (US); Kirk Pulay, Belleville, MI (US); Edward Doemer, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/807,028

(22) Filed: Jun. 15, 2022

(51) Int. Cl.
| | |
|---|---|
| *F02M 26/49* | (2016.01) |
| *F02M 26/47* | (2016.01) |
| *F02D 41/14* | (2006.01) |
| *F02M 26/14* | (2016.01) |

(52) U.S. Cl.
CPC ......... *F02M 26/49* (2016.02); *F02D 41/1446* (2013.01); *F02M 26/14* (2016.02); *F02M 26/47* (2016.02); *F02D 2200/70* (2013.01)

(58) Field of Classification Search
CPC ........ F02M 26/49; F02M 26/14; F02M 26/47; F02D 41/1446; F02D 2200/70
See application file for complete search history.

(56) References Cited

U.S. PATENT DOCUMENTS

| | | | |
|---|---|---|---|
| 6,116,083 A | 9/2000 | Cullen et al. | |
| 7,085,628 B2 * | 8/2006 | Ohmi | G01F 15/046 361/283.1 |
| 8,197,133 B2 | 6/2012 | Schultz et al. | |
| 2021/0040911 A1 * | 2/2021 | Rejeti | F01P 11/16 |

FOREIGN PATENT DOCUMENTS

JP 5285259 B2 2/2018

* cited by examiner

*Primary Examiner* — Xiao En Mo
(74) *Attorney, Agent, or Firm* — Vincent Mastrogiacomo; McCoy Russell LLP (57) ABSTRACT

Systems and methods for determining whether or not a temperature sensor is degraded are presented. In one example, a determination of degradation of the temperature sensor is based on a difference between a temperature determined from output of the temperature sensor and an estimate of a temperature of a pressure sensor.

20 Claims, 4 Drawing Sheets

METHOD AND SYSTEM FOR RATIONALIZING A TEMPERATURE WITHIN AN ENGINE SYSTEM

FIELD

The present description relates to a system and method for rationalizing a temperature within an engine system. The temperature being rationalized may be applied to compensate a temperature measurement.

BACKGROUND AND SUMMARY

An internal combustion engine may include an exhaust gas recirculation (EGR) system to reduce engine emissions and improve engine efficiency. The amount of EGR that is delivered to engine cylinders may vary with engine operating conditions, and the ability to precisely control EGR may be desirable so that the engine may not experience misfires. In addition, it may be desirable to determine the actual amount of EGR so that spark timing may be adjusted to maximize engine efficiency and emissions. One way to estimate EGR flow may be to determine a pressure drop across an EGR valve and the position of the EGR valve so that EGR flow through the valve may be determined. However, pressure readings of a pressure sensor may be influenced by a temperature of the pressure sensor and temperature of the pressure sensor may vary with the amount of EGR flow and engine temperature. In addition, even if pressure sensor readings or output is compensated for temperature, the pressure reading accuracy may degrade if temperature sensor readings are not representative of the actual temperature near the pressure sensor. Therefore, it may be desirable to provide a way of determining whether or not a temperature sensor is providing an accurate temperature reading or output.

The inventors herein have recognized the above-mentioned disadvantages and have developed a method for assessing output of a temperature sensor, comprising: generating an estimate of a temperature of a sensor coupled to an exhaust gas passage based on an engine coolant temperature and an ambient air temperature; and indicating whether or not the temperature sensor is degraded in response to the temperature of the sensor.

By estimating a temperature of a sensor and comparing the estimate of the temperature of the sensor to an output of a temperature sensor, it may be possible to determine whether or not the temperature sensor is outputting a reasonable temperature reading or indication. For example, a temperature of an EGR pressure sensor may be estimated according to an engine coolant temperature and ambient air temperature when the EGR pressure sensor is positioned near an EGR valve that is cooled via engine coolant. The temperature of the EGR pressure sensor may then be applied to judge whether or not a temperature sensor is outputting a rational temperature indication.

The present description may provide several advantages. Specifically, the approach provides a way of verifying a temperature of an EGR pressure sensor so that pressure measured by the EGR pressure sensor may be compensated for temperature. In addition, the approach may verify operation of a temperature sensor without having to deploy additional temperature sensors. Further, the approach may provide a more accurate temperature estimate than relying on engine coolant temperature in the area of the EGR pressure sensor.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
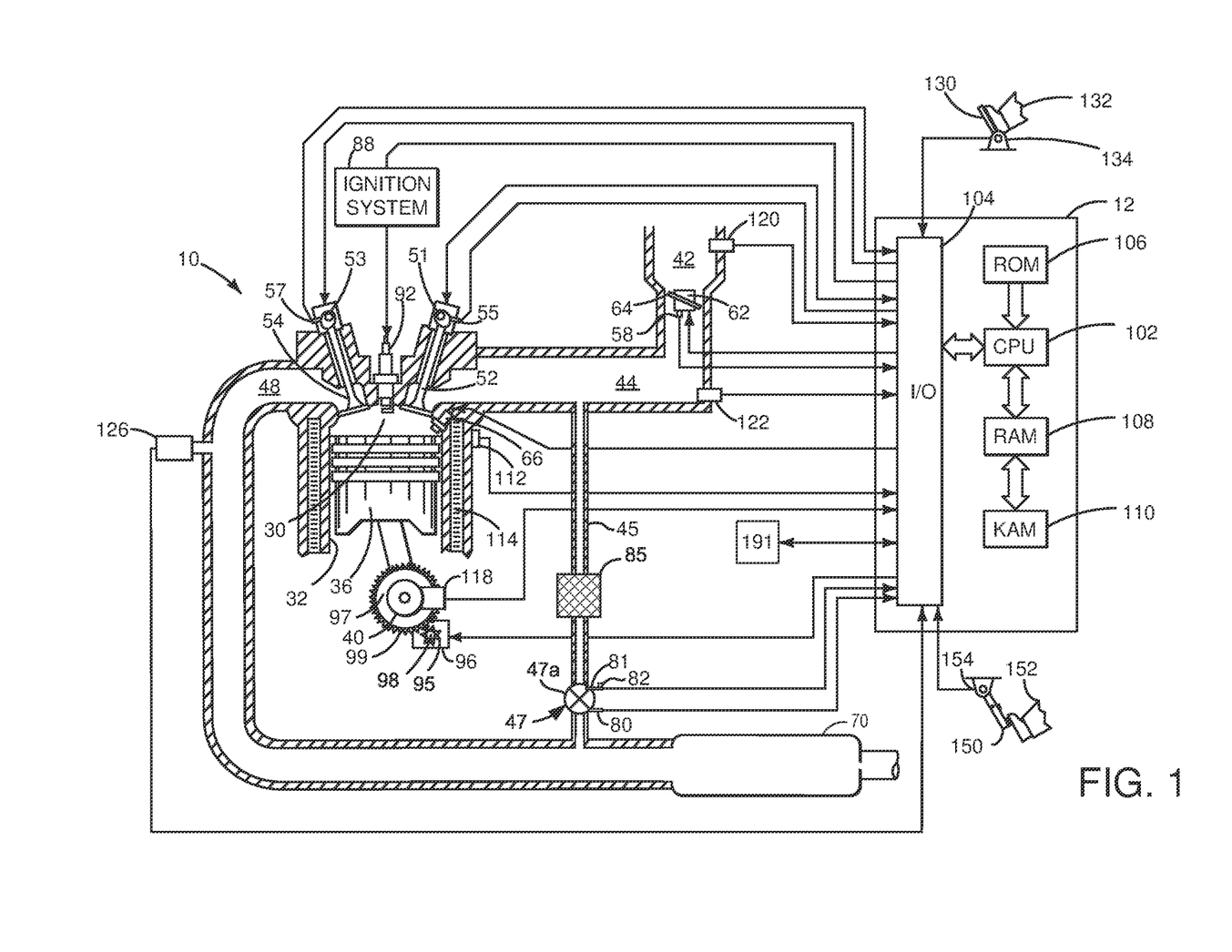
FIG. 1 is a schematic diagram of an engine.
Figure 2:
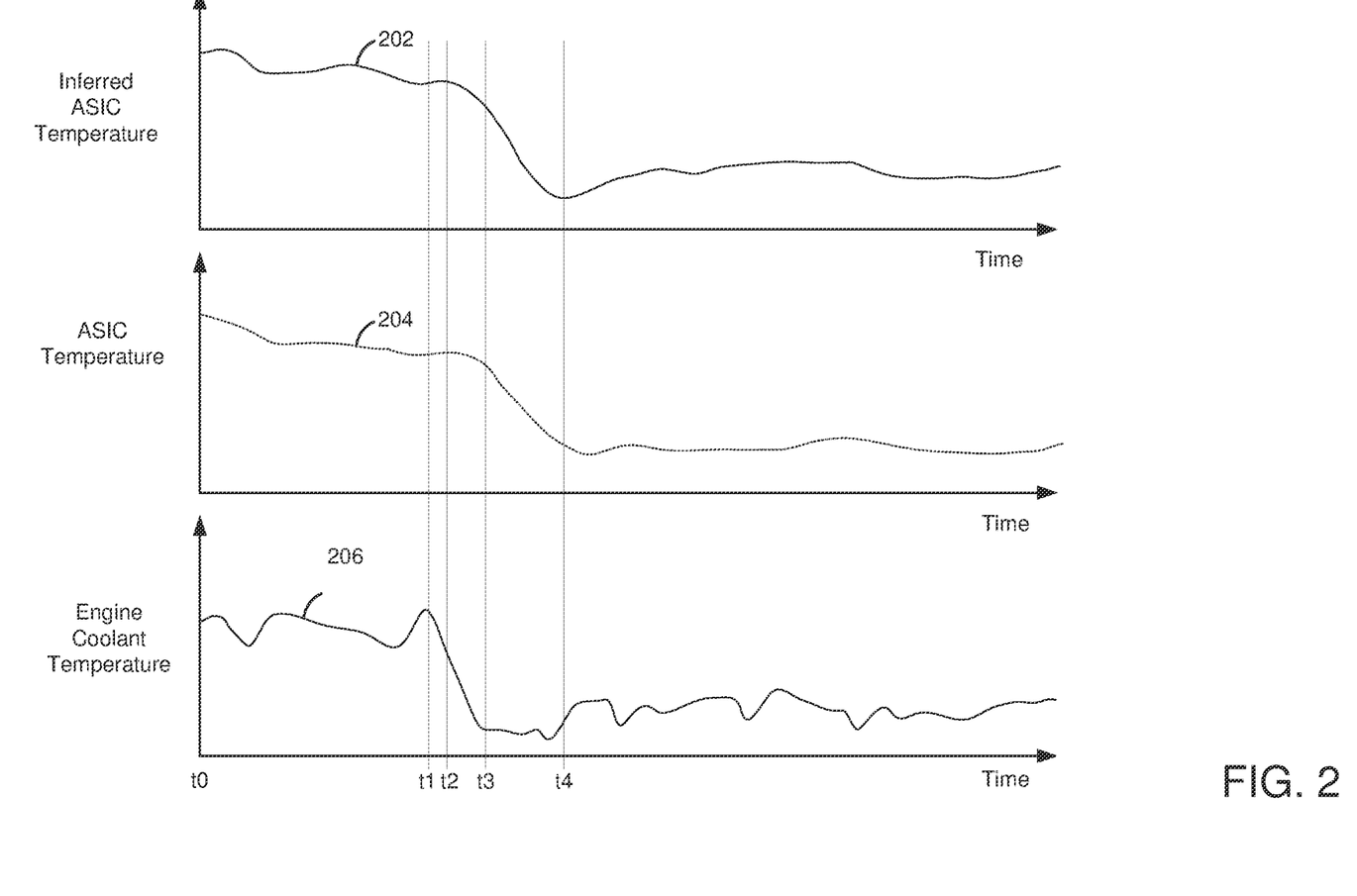
FIG. 2 is shows a plot of inferred ASIC temperature and measured ASIC temperature during transient conditions.
Figure 3:
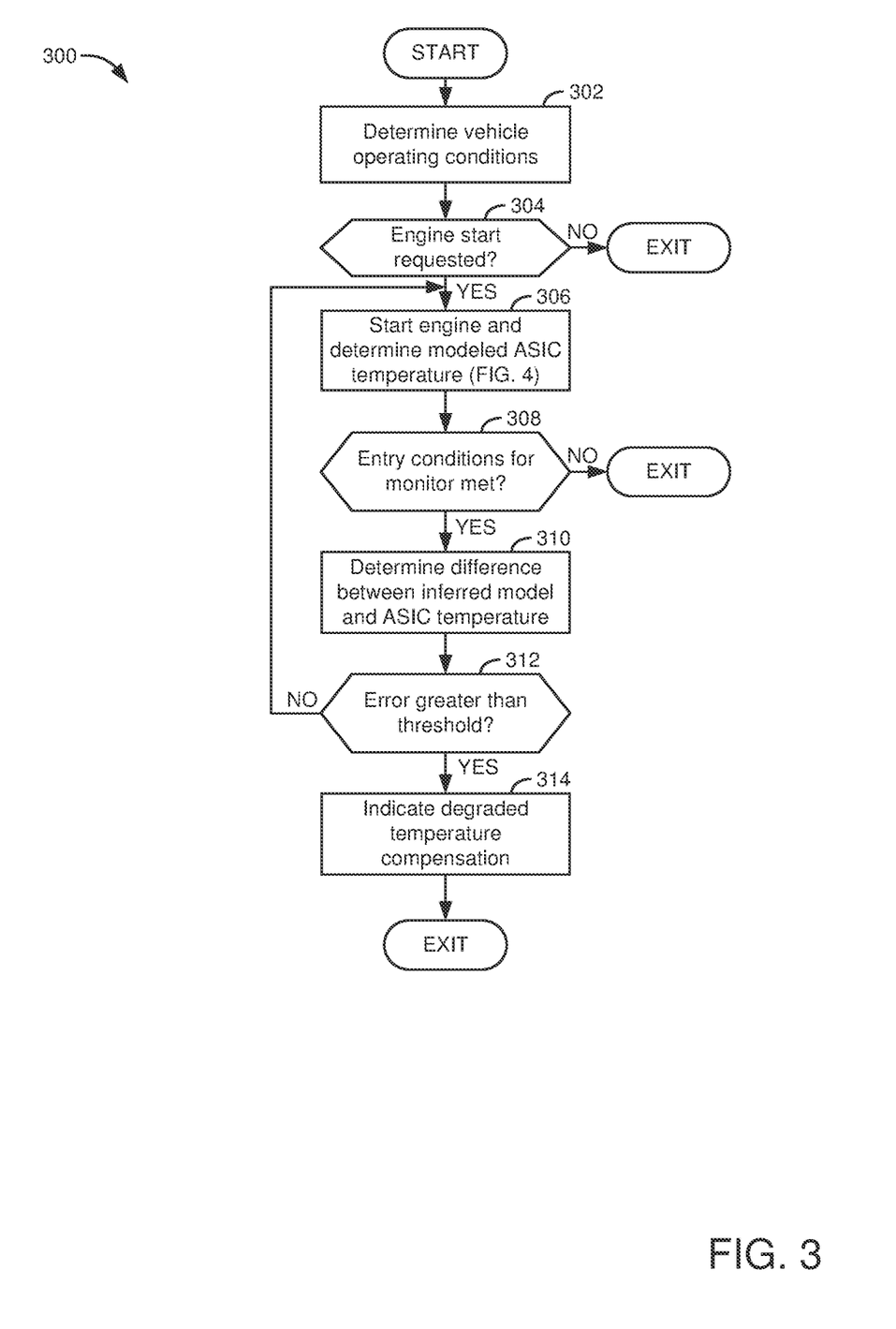
FIG. 3 shows a flowchart of a method to monitor a temperature.
Figure 4:
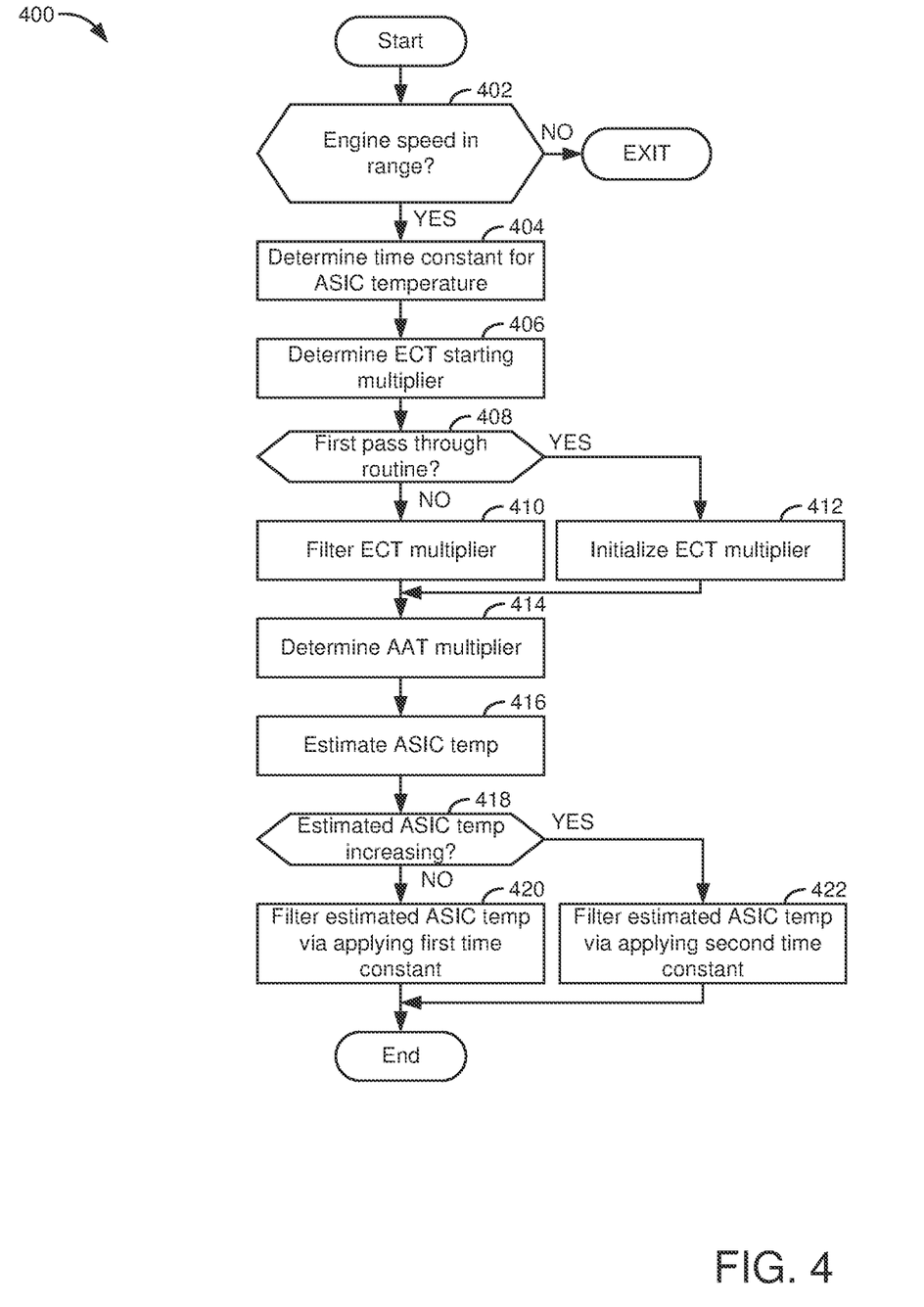
FIG. 4 is a flowchart of a method to estimate a temperature.

The present description is related to rationalizing a temperature indication provided by an application specific integrated circuit (ASIC) temperature sensor that is configured to sense a temperature at or near an EGR pressure sensor. An ASIC generated temperature value may be compared against a modeled temperature that is based on ambient air temperature and engine coolant temperature. If the modeled temperature is not within a predetermined range of a temperature that is determined by the ASIC temperature sensor, an indication of degradation of the ASIC temperature sensor may be provided. The ASIC temperature sensor may be part of an EGR system of an engine as shown in FIG. 1. The ASIC temperature and modeled ASIC temperature may respond to transient vehicle operating conditions as shown in FIG. 2. A method for monitoring an ASIC EGR temperature sensor is shown in FIG. 3. Finally, a method for modeling a temperature of an EGR pressure sensor is shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Exhaust gas may be recirculated from exhaust manifold 48 to intake manifold 44 via passage 45. EGR valve 47 may be selectively opened and closed via controller 12 to allow exhaust flow between exhaust manifold 48 and intake manifold 44. In some examples, the EGR flow rate may be measured or estimated based on a pressure drop across EGR valve 47 and EGR valve position. In particular, pressure in EGR passage 45 upstream of EGR valve 47 may be determined via pressure sensor 80. Pressure in EGR passage 45 downstream of EGR valve 47 may be determined via pressure sensor 81. Pressure sensor 81 may be combined in a same package as ASIC temperature sensor 82. Engine coolant may flow through EGR valve housing 47a to cool the EGR valve 47. The ASIC temperature sensor 82 and pressure sensor 81 are mounted to EGR valve housing 47a. Therefore, temperatures of ASIC temperature sensor and EGR pressure sensor 81 may be close to engine coolant temperature during steady state engine operating conditions. During transient engine operating conditions, output of the ASIC temperature sensor lags the engine coolant temperature. Exhaust gas may be cooled via EGR cooler 85.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by foot 132; a measurement of engine manifold pressure (MAP) from pressure sensor 122 coupled to intake manifold 44; an engine position sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Controller 12 may communicate with human/machine interface to allow controller 12 to receive data input and to provide indications of system operating conditions.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 may provide for an exhaust gas recirculation system, comprising: an engine including an exhaust passage and an exhaust gas recirculation passage; an engine coolant temperature sensor; an ambient air temperature sensor; an exhaust gas recirculation valve coupled to the exhaust gas recirculation passage; a pressure sensor assembly including a temperature sensor, the pressure sensor assembly positioned downstream of the exhaust gas recirculation valve; and a controller including non-transitory instructions executable to generate an estimate of a temperature of the pressure sensor assembly via an ambient air temperature and an engine coolant temperature, and additional instructions to adjust operation of the engine in response to a difference between a temperature determined via the temperature sensor and the estimate of the temperature of the pressure sensor. In a first example, the exhaust gas recirculation system includes where adjusting operation of the engine includes adjusting an exhaust gas flow rate. In a second example that may include the first example, the exhaust gas recirculation system further comprises additional instructions to generate the estimate of the temperature of the pressure sensor assembly via a multiplier that is a function of an engine soak time. In a third example that may include one or both of the first and second examples, the exhaust gas recirculation system further comprises additional instructions to filter the multiplier based on the engine soak time. In a fourth example that may include one or more of the first through third examples, the exhaust gas recirculation system further comprises additional instructions to determine a second multiplier from the multiplier. In a fifth example that may include one or more of the first through fourth examples, the exhaust gas recirculation system further comprises additional instructions to generate the estimate of the temperature of the pressure sensor assembly via a first time constant when the estimate of the temperature of the pressure sensor assembly is increasing. In a sixth example that may include one or more of the first through fifth examples, the exhaust gas recirculation system further comprises additional instructions to generate the estimate of the temperature of the pressure sensor assembly via a second time constant when the estimate of the temperature of the pressure sensor assembly is decreasing. In a seventh example that may include one or more of the first through sixth examples, the exhaust gas recirculation system further comprises additional instructions to indicate degradation of the temperature sensor in response to the difference exceeding a threshold value.

FIG. 2 is a plot that shows how a modeled ASIC temperature and an actual ASIC temperature respond to transient engine operating conditions. The plots of FIG. 2 show how a modeled ASIC temperature that is based on engine coolant temperature, ambient air temperature, and three filters may provide an ASIC temperature that closely follows a temperature of a fully functional ASIC temperature sensor during transient engine operating conditions. The vertical lines at t0-t4 represent times of interest during the sequence.

The first plot from the top of FIG. 2 is a plot of a modeled ASIC temperature (e.g., temperature at the location of the pressure sensor) versus time. The vertical axis represents modeled ASIC temperature and modeled ASIC temperature increases in the direction of the vertical axis arrow. The horizontal axis represents time and time increases from the left side of the plot to the right side of the plot. Trace 202 represents the modeled ASIC temperature.

The second plot from the top of FIG. 2 is a plot of an actual ASIC temperature versus time. The vertical axis represents actual ASIC temperature and actual ASIC temperature increases in the direction of the vertical axis arrow. The horizontal axis represents time and time increases from the left side of the plot to the right side of the plot. Trace 204 represents the actual ASIC temperature.

The third plot from the top of FIG. 2 is a plot of engine coolant temperature versus time. The vertical axis represents engine coolant temperature and engine coolant temperature increases in the direction of the vertical axis arrow. The horizontal axis represents time and time increases from the left side of the plot to the right side of the plot. Trace 206 represents the engine coolant temperature.

At time t0, the engine coolant temperature, inferred ASIC temperature, and measured ASIC temperature are at a higher level. Such conditions may be present when an engine is operated at a higher load and speed.

At time t1, the engine coolant temperature begins to decline. The inferred coolant temperature and the measured ASIC temperature are declining at a slow rate.

At time t2 the inferred or modeled ASIC temperature begins to fall at a higher rate. Shortly thereafter the measured ASIC temperature begins to fall at a higher rate. The engine coolant temperature continues to fall at a higher rate.

At time t3, the engine coolant temperature ends its descent and it levels off. The inferred ASIC temperature continues to decline as does the actual ASIC temperature.

At time t4, the inferred ASIC temperature ends its descent while the actual ASIC temperature continues down. The actual ASIC temperature ends its decline shortly after time t4. The engine coolant temperature continues at a leveled off trajectory.

In this way, an inferred ASIC temperature may stay close to an actual ASIC temperature during transient vehicle operating conditions. This may allow ASIC temperature signal degradation to be determined by applying a smaller range limit between the actual ASIC temperature and the modeled ASIC temperature.

Turning now to FIG. 3, a flowchart of a method for monitoring output of an ASIC temperature sensor that is a basis for compensating a pressure measurement in an EGR tube or passage is shown. The method of FIG. 3 may operate in cooperation with the method of FIG. 3 in the system of FIG. 1. Method 300 may be carried out by a control system of a vehicle, such as controller 12 to monitor a temperature sensor such as temperature sensor 82. The method of FIG. 3 in cooperation with controller 12 may adjust actuators in the physical word.

At 302, method 300 determines operating conditions. Operating conditions may include but are not limited to engine torque demand, engine speed, engine torque, vehicle speed, driver demand torque, ambient air temperature and pressure, desired EGR fraction, actual EGR fraction or EGR amount, and battery state of charge. Driver demand torque demand may be derived from driver demand pedal 130 and controller 12 of FIG. 1. Engine torque may be estimated from engine speed and load. Method 300 may determine the operating conditions via the sensors and actuators that are described herein. Method 300 proceeds to 304 after operating conditions are determined.

At 304, method 300 judges whether or not an engine start is requested. An engine start request may be input via a vehicle operator or an autonomous driver. The engine start request may be input via a human/machine interface. If method 300 judges that a request to start the engine has been made, the answer is yes and method 300 proceeds to 306. Otherwise, the answer is no and method 300 proceeds to exit.

At 306, method 300 starts the engine and determines an ASIC temperature (e.g., a temperature at the EGR pressure sensor) according to the method of FIG. 4. If the engine is already started, method 300 continues to estimate the ASIC temperature according to the method of FIG. 4. Method 300 proceeds to 308.

At 308, method 300 judges whether or not conditions are present to monitor output of an ASIC temperature sensor that determines a temperature at the location of the pressure sensor (e.g., 81 of FIG. 1). In one example, method 300 may determine that conditions are present to monitor output of the ASIC sensor if the engine has just started, if a vehicle that includes the engine has traveled a threshold distance, or if a diagnostic is requested via a service technician. If method 300 judges that conditions are present to monitor output of the ASIC, the answer is yes and method 300 proceeds to 310. Otherwise, method 300 exits.

At 310, method 300 determines a difference between a temperature measure by an ASIC temperature sensor and an inferred or modeled ASIC temperature. In one example, the difference by be expressed via the following equation:

$$ASICerror = measASICtmp - modelASICtmp$$

where ASIC error is the temperature difference between the ASIC measured temperature and the modeled ASIC temperature, measASICtmp is the ASIC measured temperature, and modelASICtmp is the modeled ASIC temperature. Method 300 proceeds to 312.

At 312, method 300 judges whether or not the error between the modeled ASIC temperature and the measured ASIC temperature is greater than a threshold temperature (e.g., ±5 degrees Celsius). If so, the answer is yes and method 300 proceeds to 314. Otherwise, the answer is no and method 300 returns to 306.

At 314, method 300 indicates a degraded ASIC temperature sensor. Method 300 may indicate the degraded ASIC temperature sensor via sending a message to a human/machine interface. In addition, method 300 may take mitigating actions in response to the indication of the degraded ASIC temperature sensor. For example, method 300 may reduce EGR flow to the engine by at least partially closing the EGR valve. In another example, method 300 may operate the EGR system via applying the modeled ASIC temperature in place of the measured ASIC temperature. In other examples, method 300 may deactivate the EGR system, thereby preventing EGR flow to the engine while the ASIC temperature sensor is degraded. Method 300 proceeds to exit.

Thus, method 300 may determine the presence or absence of an ASIC temperature sensor according to a difference between a modeled temperature and a measured temperature. The modeled ASIC temperature may be based on engine coolant temperature and ambient air temperature.

Referring now to FIG. 4, a flowchart of a method for modeling a temperature that is sensed via an ASIC temperature sensor, the temperature that is sensed by the ASIC temperature sensor is a temperature of an EGR pressure sensor that is mounted to an EGR valve that is cooled via engine coolant. The method of FIG. 4 may operate in cooperation with the method of FIG. 3 in the system of FIG. 1. Method 400 may be carried out by a control system of a vehicle, such as controller 12 to model a temperature that is sensed via a temperature sensor (e.g., temperature sensor 82). Temperature sensor 82 may be configured to sense a temperature of a pressure sensor (e.g., 81 of FIG. 1) to that a pressure value that is output from pressure sensor 81 may be compensated for temperature of the pressure sensor. The method of FIG. 4 in cooperation with controller 12 may model an ASIC temperature.

At 402, method 400 judges whether or not engine speed is within a desired speed range (e.g., between 700 RPM and 6000 RPM). If method 400 judges that engine speed is within the desired speed range, the answer is yes and method 400 proceeds to 404. Otherwise, the answer is no and method 400 proceeds to exit.

At 404, method 400 determines a time constant (e.g., a variable that describes how a device or system responds to a stepwise change to an input to the system or device) for filtering engine coolant temperature. In one example, method 400 determines a time constant by referencing a two dimensional table according to engine soak time (e.g., a total amount of time that an engine has been stopped (e.g., not rotating and combusting fuel) between two sequential engine running periods). The two dimensional table outputs a time constant that is used via a filter engine coolant temperature for the purpose of modeling the ASIC temperature. Values stored in the table may be determined via cold starting the engine and adjusting values in the table such that the final ASIC temperature output from the model follows an ASIC measured temperature. In one example, the time constant may be named egrmon_p_egrp_tc. Method 400 proceeds to 406.

At 406, method 400 determines an engine coolant temperature (ECT) starting multiplier. The engine coolant temperature multiplier is applied after the engine is cold started. In one example, method 400 references a two dimensional table via engine soak time. Values stored in the table may be determined via cold starting the engine and adjusting values in the two dimensional table so that the final ASIC temperature output from the model follows the ASIC measured temperature. In one example, the engine coolant temperature multiplier may be named egrmon_p_ect_mul_strt. Method 400 proceeds to 408.

At 408, method 400 judges if method 400 is being executed a first time since the engine was most recently started. If so, the answer is yes and method 400 proceeds to 412. Otherwise, the answer is no and method 400 proceeds to 410.

At 412, method 400 initializes an engine coolant temperature filter multiplier to the value that was determined at 406. The engine coolant temperature filter multiplier may be named egrmon_mul_ect. Method 400 proceeds to 414.

At 410, method 400 determines the engine coolant temperature filter multiplier by applying a filter that filters toward its final value at a rate that is based on engine soak time. In one example, the filter may be applied according to the following instruction:

$$egr\_mon\_mul\_ect = rolav\_tc(egrmon\_mul\_ect, egr\_mon\_p\_ect\_mul\_end, egr\_delta\_sec, egrmon\_p\_egrp\_tc)$$

where egr_mon_mul_ect is the engine coolant temperature filter multiplier, rolav_tc is a rolling average digital filter that returns the engine coolant temperature filter multiplier, egrmon_mul_ect is the most recent filtered engine coolant temperature filter multiplier, egrmon_p_ect_mul_end is the final engine coolant temperature filter multiplier value, egr_delta_sec is an amount of time between execution cycles of method 400, and egrmon_p_egrp_tc is the time constant determined at step 404. Method 400 proceeds to 414.

At 414, method 400 determines an ambient air temperature filter multiplier via the following equation:

$$egrmon\_mul\_aat = 1 - egrmon\_mul\_ect$$

where egrmon_mul_aat is the ambient air temperature multiplier and egr_mon_mul_ect is the engine coolant temperature filter multiplier. Method 400 proceeds to 416.

At 416, method 400 determines ASIC temperature based on engine coolant temperature and ambient air temperature before applying filtering for increasing or decreasing ASIC temperature. The ASIC temperature may be determined according to the following equation:

$$egrmon\_te\_egrp\_electr\_a = ptect\_ect * egrmon\_mul\_ect + ptaat\_aat\_estkam * egrmon\_mul\_aat$$

where egrmon_te_egrp_electr_ais the ASIC temperature, ptect_ect is the engine coolant temperature, egrmon_mul_ect is the engine coolant temperature filter multiplier that was determined at step 410, ptaat_aat_estkam is ambient air temperature, and egrmon_mul_aat is the ambient air temperature filter multiplier determined at step 414.

At 418, method 400 judges whether or not the ASIC temperature is increasing. Method 400 may determine if ASIC temperature is increasing based on whether a most recent ASIC temperature estimate is larger than a second most recent ASIC temperature estimate. If method 400 judges that the ASIC temperature is increasing, the answer is yes and method 400 proceeds to 422. Otherwise, the answer is no and method 400 proceeds to 420.

At 422, method 400 determines the final ASIC temperature estimate for conditions when the ASIC temperature is increasing. In one example, the final ASIC temperature may be determined via the following equation:

$$egrmon\_te\_inf\_egrp\_electr = rolav\_tc(egrmon\_te\_inf\_egrp\_electr, egrmon\_te\_inf\_egrp\_electr\_a, egr\_delta\_sec, egrmon\_tm\_egrp\_inc\_tc)$$

where egrmon_te_inf_egrp_electr is the final ASIC temperature estimate, rolav_tc is a rolling average digital filter that returns the final ASIC temperature estimate, egrmon_te_inf_egrp_electr is the most recent filtered ASIC temperature for increasing ASIC temperature, egrmon_te_inf_egrp_electr_a is ASIC temperature that was determined at step 416, egr_delta_sec is an amount of time between execution cycles of method 400, and egrmon_tm_egrp_inc_tc is a calibrated time constant for increasing ASIC temperature. Method 400 proceeds to exit after the final ASIC temperature is determined.

At 420, method 400 determines the final ASIC temperature estimate for conditions when the ASIC temperature is not increasing. In one example, the final ASIC temperature may be determined via the following equation:

$$egrmon\_te\_inf\_egrp\_electr = rolav\_tc(egrmon\_te\_inf\_egrp\_electr, egrmon\_te\_inf\_egrp\_electr\_a, egr\_delta\_sec, egrmon\_tm\_egrp\_dec\_tc)$$

where egrmon_te_inf_egrp_electr is the final ASIC temperature estimate, rolav_tc is a rolling average digital filter that returns the final ASIC temperature estimate, egrmon_te_inf_egrp_electr is the most recent filtered ASIC temperature for increasing ASIC temperature, egrmon_te_inf_egrp_electr_a is ASIC temperature that was determined at step 416, egr_delta_sec is an amount of time between execution cycles of method 400, and egrmon_tm_egrp_dec_tc is a calibrated time constant for decreasing ASIC temperature. Method 400 proceeds to exit after the final ASIC temperature is determined.

In this way, a temperature at an ASIC may be estimated from engine coolant temperature and ambient air temperature. The ASIC temperature may include time constants for increasing ASIC temperature and decreasing ASIC temperature.

Thus, the methods of FIGS. 3 and 4 provide for a method for assessing output of a temperature sensor, comprising: generating an estimate of a temperature of a sensor coupled to an exhaust gas passage based on an engine coolant temperature and an ambient air temperature; and indicating whether or not the temperature sensor is degraded in response to the temperature of the sensor. In a first example, the method includes where the sensor is a pressure sensor, and wherein the temperature sensor is integrated with the temperature sensor. In a second example that may include the first example, the method includes where the temperature sensor is cooled via engine coolant. In a third example that may include one or both of the first and second examples, the method includes where the exhaust gas passage is an exhaust gas recirculation passage. In a fourth example that may include one or more of the first through third examples, the method further comprises performing mitigating actions in response to the temperature sensor being degraded. In a fifth example that may include one or more of the first through fourth examples, the method includes where the mitigating actions include compensating an output of sensor via the estimate of the temperature. In a sixth example that may include one or more of the first through fifth examples, the method includes where the mitigating actions include reducing a rate of exhaust gas flow in the exhaust gas passage.

The methods of FIGS. 3 and 4 also provide for a method assessing output of a temperature sensor, comprising: generating an estimate of a temperature of a sensor coupled to an exhaust gas passage based on a first time constant and a second time constant; and indicating whether or not the temperature sensor is degraded in response to the temperature of the sensor. In a first example, the method includes where the first time constant is based on the estimate of the temperature of the sensor increasing. In a second example that may include the first example, the method includes where the second time constant is based on the estimate of the temperature sensor decreasing. In a third example that may include one or both of the first and second examples, the method includes where the indicating is via delivering a message to a human/machine interface. In a fourth method that may include one or more of the first through third examples, the method further comprises determining whether the temperature sensor is degraded in response to a difference between a temperature determined from the temperature sensor and the estimate of the temperature of the sensor.

As will be appreciated by one of ordinary skill in the art, methods described in FIGS. 3 and 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for assessing an output of a temperature sensor, comprising:
   generating an estimate of a temperature of a sensor coupled to an exhaust gas passage based on an engine coolant temperature and an ambient air temperature; and
   indicating whether or not the temperature sensor is degraded in response to the temperature of the sensor.

2. The method of claim 1, where the sensor is a pressure sensor, and wherein the temperature sensor is integrated with the temperature sensor.

3. The method of claim 1, where the temperature sensor is cooled via engine coolant.

4. The method of claim 1, where the exhaust gas passage is an exhaust gas recirculation passage.

5. The method of claim 1, further comprising performing mitigating actions in response to the temperature sensor being degraded.

6. The method of claim 5, where the mitigating actions include compensating the output of sensor via the estimate of the temperature.

7. The method of claim 5, where the mitigating actions include reducing a rate of exhaust gas flow in the exhaust gas passage.

8. An exhaust gas recirculation system, comprising:
an engine including an exhaust passage and an exhaust gas recirculation passage;
an engine coolant temperature sensor;
an ambient air temperature sensor;
an exhaust gas recirculation valve coupled to the exhaust gas recirculation passage;
a pressure sensor assembly including a temperature sensor, the pressure sensor assembly positioned downstream of the exhaust gas recirculation valve; and
a controller including non-transitory instructions executable to generate an estimate of a temperature of the pressure sensor assembly via an ambient air temperature and an engine coolant temperature, and additional instructions to adjust operation of the engine in response to a difference between a temperature determined via the temperature sensor and the estimate of the temperature of the pressure sensor assembly.

9. The exhaust gas recirculation system of claim 8, where adjusting operation of the engine includes adjusting an exhaust gas flow rate.

10. The exhaust gas recirculation system of claim 8, further comprising additional instructions to generate the estimate of the temperature of the pressure sensor assembly via a multiplier that is a function of an engine soak time.

11. The exhaust gas recirculation system of claim 10, further comprising additional instructions to filter the multiplier based on the engine soak time.

12. The exhaust gas recirculation system of claim 11, further comprising additional instructions to determine a second multiplier from the multiplier.

13. The exhaust gas recirculation system of claim 8, further comprising additional instructions to generate the estimate of the temperature of the pressure sensor assembly via a first time constant when the estimate of the temperature of the pressure sensor assembly is increasing.

14. The exhaust gas recirculation system of claim 13, further comprising additional instructions to generate the estimate of the temperature of the pressure sensor assembly via a second time constant when the estimate of the temperature of the pressure sensor assembly is decreasing.

15. The exhaust gas recirculation system of claim of claim 8, further comprising additional instructions to indicate degradation of the temperature sensor in response to the difference exceeding a threshold value.

16. A method assessing output of a temperature sensor, comprising:
generating an estimate of a temperature of a sensor coupled to an exhaust gas passage based on a first time constant and a second time constant; and
indicating whether or not the temperature sensor is degraded in response to the temperature of the sensor.

17. The method of claim 16, where the first time constant is based on the estimate of the temperature of the sensor increasing.

18. The method of claim 17, where the second time constant is based on the estimate of the temperature sensor decreasing.

19. The method of claim 16, where the indicating is via delivering a message to a human/machine interface.

20. The method of claim 16, further comprising determining whether the temperature sensor is degraded in response to a difference between a temperature determined from the temperature sensor and the estimate of the temperature of the sensor.

* * * * *